United States Patent
Yoshioka et al.

(10) Patent No.: US 12,359,748 B2
(45) Date of Patent: Jul. 15, 2025

(54) EGR VALVE

(71) Applicant: AISAN KOGYO KABUSHIKI KAISHA, Obu (JP)

(72) Inventors: Mamoru Yoshioka, Susono (JP); Shinji Kawai, Gifu (JP); Kazumasa Nakashima, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 18/688,666

(22) PCT Filed: Oct. 17, 2022

(86) PCT No.: PCT/JP2022/038503
§ 371 (c)(1),
(2) Date: Mar. 1, 2024

(87) PCT Pub. No.: WO2023/079929
PCT Pub. Date: May 11, 2023

(65) Prior Publication Data
US 2024/0295277 A1    Sep. 5, 2024

(30) Foreign Application Priority Data
Nov. 5, 2021 (JP) .................... 2021-180841

(51) Int. Cl.
*F16K 41/04* (2006.01)
*F02M 26/53* (2016.01)
(Continued)

(52) U.S. Cl.
CPC ............. *F16K 41/04* (2013.01); *F02M 26/53* (2016.02); *F02M 26/54* (2016.02); *F02M 26/67* (2016.02);
(Continued)

(58) Field of Classification Search
CPC ......... F16K 41/04; F16K 41/08; F02M 26/54; F02M 26/70; F02M 26/67; F02M 26/72;
(Continued)

(56) References Cited

U.S. PATENT DOCUMENTS

| 2005/0082507 | A1* | 4/2005 | Tanaka | F16J 15/3228 251/318 |
| 2012/0325183 | A1* | 12/2012 | Hatano | F16K 41/04 123/568.11 |
| 2022/0244908 | A1 | 8/2022 | Kurabayashi | |

FOREIGN PATENT DOCUMENTS

| DE | 102019115347 A1 * | 3/2020 | ............. F02M 26/67 |
| FR | 2977650 A1 * | 1/2013 | ............. F02M 26/53 |

(Continued)

OTHER PUBLICATIONS

Dec. 13, 2022 International Search Report issued in International Patent Application No. PCT/JP2022/038503.
(Continued)

*Primary Examiner* — Marina A Tietjen
(74) *Attorney, Agent, or Firm* — Oliff PLC (57) ABSTRACT

This EGR valve includes: a valve seat and a valve element provided in a flow passage of a housing; a valve shaft that moves the valve element relative to the valve seat; a step motor that drives the valve shaft together with the valve element; a bearing that drivably supports the valve shaft; a seal member having a lip part adjacent to the bearing and contacting the valve shaft to seal between the housing and the valve shaft; a mounting hole to retain the seal member in the housing; and a deposit guard member adjacent to the seal member to prevent deposits from entering into the mounting hole. One end of the seal member is provided with a seal protrusion protruding toward one end of the deposit (Continued)

guard member and contacting with the one end while being deformed to seal between the seal member and the deposit guard member.

12 Claims, 9 Drawing Sheets

(51) Int. Cl.
| | |
|---|---|
| *F02M 26/54* | (2016.01) |
| *F02M 26/67* | (2016.01) |
| *F02M 26/70* | (2016.01) |
| *F02M 26/72* | (2016.01) |
| *F02M 26/74* | (2016.01) |
| *F16J 15/3236* | (2016.01) |
| *F16J 15/3252* | (2016.01) |
| *F16J 15/3276* | (2016.01) |
| *F16K 41/08* | (2006.01) |
| *F16K 31/04* | (2006.01) |

(52) U.S. Cl.
CPC ............ *F02M 26/70* (2016.02); *F02M 26/72* (2016.02); *F02M 26/74* (2016.02); *F16J 15/3236* (2013.01); *F16J 15/3252* (2013.01); *F16J 15/3276* (2013.01); *F16K 31/04* (2013.01); *Y02T 10/12* (2013.01)

(58) Field of Classification Search
CPC .... F02M 26/74; F16J 15/3252; F16J 15/3276; F16J 15/3236; Y02T 10/12
See application file for complete search history.

(56) References Cited

FOREIGN PATENT DOCUMENTS

| JP | H05-017273 U | 3/1993 |
|---|---|---|
| JP | 2005-282520 A | 10/2005 |
| JP | 2013-007266 A | 1/2013 |
| JP | 2020-180622 A | 11/2020 |
| JP | 2021-069017 A | 4/2021 |

OTHER PUBLICATIONS

May 2, 2024 International Preliminary Report on Patentability issued in International Patent Application No. PCT/JP2022/038503.

* cited by examiner

EGR VALVE

CROSS-REFERENCE TO RELATED APPLICATIONS

This is a US national phase application based on the PCT International Patent Application No. PCT/JP2022/038503 filed on Oct. 17, 2022, and claiming the priority to Japanese Patent Application No. 2021-180841 filed on Nov. 5, 2021, the entire contents of which are incorporated by reference herein.

TECHNICAL FIELD

The art disclosed in this description relates to an EGR valve, which constitutes an EGR device and is used to regulate a flow rate of EGR gas in an EGR passage.

BACKGROUND ART

As the art of the above type, for example, an "EGR valve" disclosed in Patent Document 1 listed below has been conventionally known. This EGR valve includes a housing having a flow passage for EGR gas, a valve seat provided in the flow passage, a valve element provided to be seatable on the valve seat, a valve shaft provided integral with the valve element to move the valve element with respect to the valve seat, a driving unit for stroke movement of the valve shaft together with the valve element in an axial direction, a bearing provided between the housing and the valve shaft, the bearing having one end and the other end in the axial direction and supporting the valve shaft so that the valve shaft is able to perform a stroke movement, a seal member provided between the housing and the valve shaft, adjacent to the bearing, to seal between the housing and the valve shaft, the seal member having one end and the other end in the axial direction and including a seal part in contact with the valve shaft on the other end side, and a deposit guard part provided between the housing and the valve shaft, adjacent to the seal member, to guard the space between the housing and the valve shaft from deposits, the deposit guard part having one end and the other end in the axial direction, wherein the one end of the seal member is placed adjacent to the other end of the bearing, the one end of the deposit guard part is placed adjacent to the other end of the seal member and the seal part, and the other end of the deposit guard part is placed facing the flow passage.

RELATED ART DOCUMENTS

Patent Documents

Patent Document 1: Japanese unexamined patent application publication No. 2013-7266

SUMMARY OF INVENTION

Problems to be Solved by the Invention

However, in the EGR valve described in Patent Document 1, EGR gas and condensed water generated from the EGR gas may enter and accumulate in a gap between the seal member and the deposit guard part. Further, if the housing corrodes due to the accumulated condensed water, the EGR gas and the condensed water may leak toward the bearing and the driving unit via the outer periphery of the seal member, causing a drive failure in the EGR valve.

The present disclosure was developed in view of the above circumstances and has a purpose to provide an EGR valve capable of suppressing EGR gas and condensed water from entering the gap between the seal member and the deposit guard part to prevent corrosion of the housing due to the condensed water.

Means of Solving the Problems (1) To achieve the above-mentioned purpose, an aspect of the present invention provides an EGR valve comprising: a housing having a flow passage for EGR gas; a valve seat provided in the flow passage; a valve element provided to be seatable on the valve seat; a valve shaft provided integral with the valve element to move the valve element with respect to the valve seat; a driving unit for driving the valve shaft together with the valve element; a bearing provided between the housing and the valve shaft to drivably support the valve shaft, the bearing having one end and an other end in an axial direction; a seal member provided between the housing and the valve shaft, adjacent to the bearing, to seal between the housing and the valve shaft, the seal member having one end and an other end in the axial direction and including a seal part in contact with the valve shaft on a side of the other end; a mounting hole provided in the housing to retain the seal member; and a deposit guard part provided between the housing and the valve shaft, adjacent to the seal member retained in the mounting hole, to prevent intrusion of deposits from the flow passage into the mounting hole, the deposit guard part having one end and an other end in the axial direction, the one end of the seal member being placed adjacent to the other end of the bearing, the one end of the deposit guard part being placed adjacent to the other end of the seal member and the seal part, and the other end of the deposit guard part facing the flow passage, wherein the other end of the seal member is provided with a seal protrusion protruding toward the one end of the deposit guard part and contacting the one end while being deformed to seal between the seal member and the deposit guard part.

According to the above-described configuration (1), the other end of the seal member is provided with the seal protrusion, which protrudes toward the one end of the deposit guard part and is in contact with the one end of the deposit guard part while being deformed to seal between the seal member and the deposit guard part. Thus, even if a gap is formed between the housing, the seal member, and the deposit guard part, this gap is blocked by the seal protrusion, shutting off a fluid from flowing into the gap.

(2) To achieve the above-mentioned purpose, preferably, in the forgoing configuration (1), the seal protrusion has a lip shape with a distal end portion slanted and converged toward the valve shaft.

According to the above-described configuration (2), in addition to the operations of the foregoing configuration (1), the seal protrusion is formed in the lip shape having the distal end portion slanted and converged toward the valve shaft. This configuration can reduce the initial contact pressure between the seal protrusion and the deposit guard part. When a positive pressure acts on the seal protrusion from the flow passage side, the contact pressure between the seal protrusion and the deposit guard part can be increased.

(3) To achieve the above-mentioned purpose, preferably, in the forgoing configuration (1) or (2), the deposit guard part is constituted of a deposit guard member retained in the mounting hole.

According to the above-described configuration (3), in addition to the operations of the foregoing configuration (1)

or (2), the seal member and the deposit guard member can be mounted respectively in the mounting hole from the flow passage side.

(4) To achieve the above-mentioned purpose, preferably, in the forgoing configuration (3), a part of the mounting hole, in which the deposit guard member is retained, has an inner diameter set larger than an inner diameter of another part of the mounting hole, in which the seal member is retained.

According to the above-described configuration (4), in addition to the operations of the foregoing configuration (3), the inner diameter of the part of the mounting hole, in which the deposit guard member is retained, is set larger than the inner diameter of the part of the mounting hole, in which the seal member is retained. Thus, even if condensed water enters a gap between the housing, the seal member, and the deposit guard member, the condensed water will flow to the part of the mounting hole having the larger diameter, where the deposit guard member is retained, so that the condensed water is less likely to intervene between the housing and the seal member.

(5) To achieve the above-mentioned purpose, preferably, in any one of the forgoing configurations (1) to (4), at least one communicating path is provided between a part of the mounting hole, in which the seal member is retained, and the seal member, to allow communication between a side of the one end and the side of the other end of the seal member.

According to the above-described configuration (5), in addition to the operations of any one of the foregoing configurations (1) to (4), the communicating path is provided between the portion of the mounting hole in which the seal member is retained and the seal member to allow communication between the one end side and the other end side of the seal member. Accordingly, when a negative pressure acts on the seal protrusion from the flow passage side, the seal protrusion is pulled and deformed by the negative pressure and separates from the deposit guard member or the one end of the deposit guard member, fresh air will flow from the bearing side (the atmosphere side) to the flow passage side through the communicating path and the gap, thereby sweeping the communicating path and the gap.

Effects of the Invention

According to the foregoing configuration (1), it is possible to suppress EGR gas and condensed water from entering the gap between the housing, seal member, and deposit guard member, and thus prevent corrosion of the housing due to the condensed water.

According to the above-described configuration (2), in addition to the effects of the foregoing configuration (1), the seal protrusion can tightly contact the deposit guard member or the one end of the deposit guard member, thus improving the sealing property of the seal protrusion.

According to the above-described configuration (3), in addition to the effects of the foregoing configuration (1) or (2), the contact allowance between the seal protrusion and the deposit guard member can be easily adjusted.

According to the above-described configuration (4), in addition to the effects of the foregoing configuration (3), it is possible to further suppress the corrosion of the housing due to the condensed water.

According to the above-described configuration (5), in addition to the effects of any one of the foregoing configurations (1) to (4), even if EGR gas and condensed water enter the gap between the housing, the seal member, and the deposit guard member or deposit guard member, and the communicating path, the condensed water and others can be discharged into the flow passage by sweeping utilizing the intake-air negative pressure acting on the seal protrusion from the flow passage.

MODE FOR CARRYING OUT THE INVENTION

Hereinafter, several embodiments embodying an EGR valve will now be described. The EGR valve, as well known, is installed in an EGR passage for allowing a part of exhaust gas, which is discharged from an engine toward an exhaust passage, to flow as EGR gas into an intake passage, and is used to regulate the flow rate of the EGR gas in the EGR passage. The following description is given assuming the above installation state.

First Embodiment

A first embodiment embodying an EGR valve will be described first, referring to the drawings.

(Configuration of EGR Valve)

Figure 1:
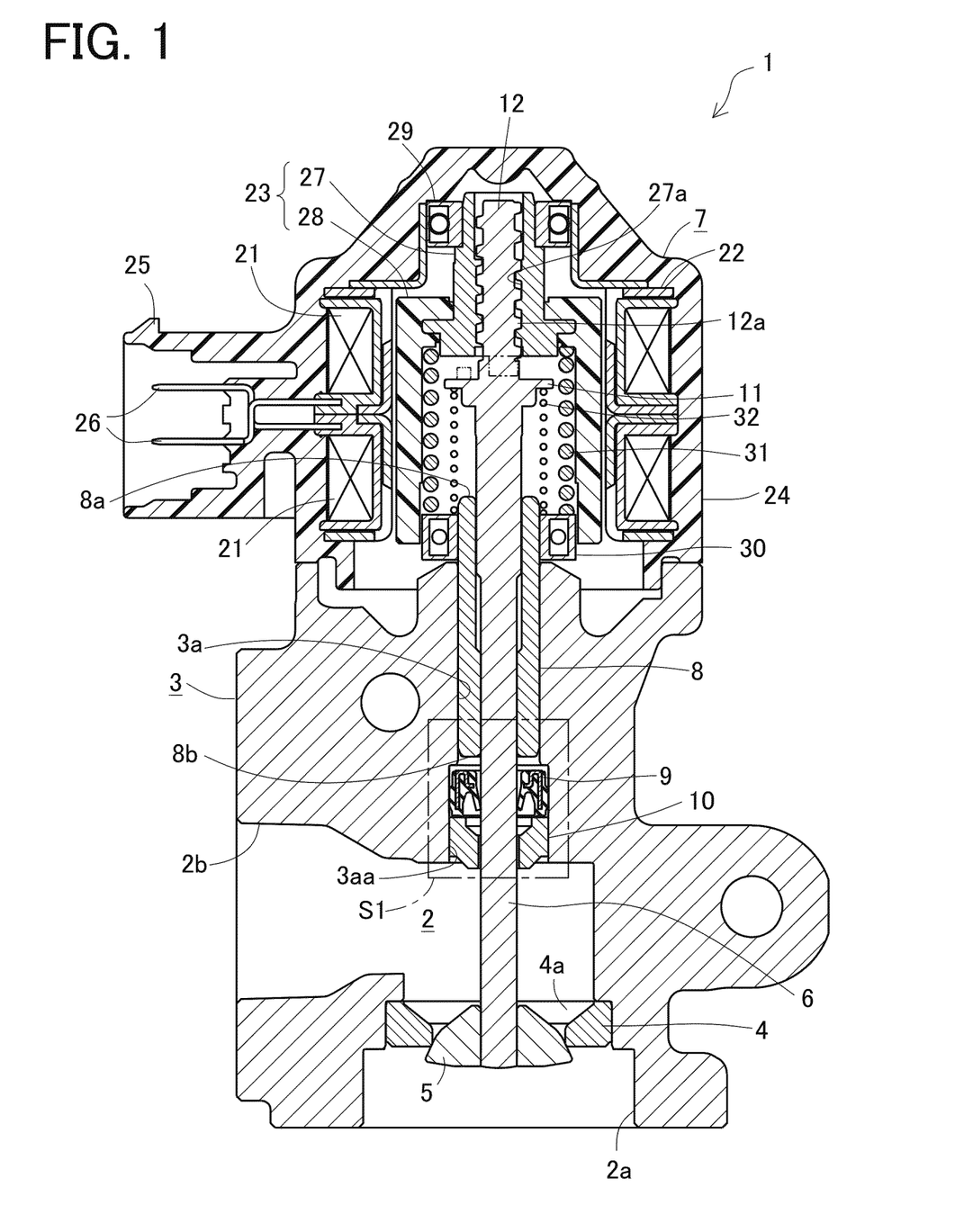
FIG. 1 is a front cross-sectional view showing an EGR valve during full-closing in a first embodiment.

FIG. 1 is a front cross-sectional view showing an EGR valve 1 during full-closing in the present embodiment. This EGR valve 1 is constituted as a poppet valve and as an electrically-operated valve. As shown in FIG. 1, the EGR valve 1 includes a housing 3 having a flow passage 2 for EGR gas, a valve seat 4 provided in the flow passage 2, a valve element 5 provided to be seatable on the valve seat 4, a valve shaft 6 provided integral with the valve element 5 to move the valve element 5 with respect to the valve seat 4, a step motor 7 for driving (stroke movement) of the valve shaft 6 together with the valve element 5, a thrust bearing 8 provided between the housing 3 and the valve shaft 6 to support the valve shaft 6 to allow driving (stroke movement) of the valve shaft 6, a lip seal 9 provided between the housing 3 and the valve shaft 6, adjacent to the thrust bearing 8, to seal between the housing 3 and the valve shaft 6, and a deposit guard plug 10 provided adjacent to the lip seal 9 to prevent intrusion of deposits in between the housing 3 and the valve shaft 6.

As shown in FIG. 1, the thrust bearing 8 has one end 8a and the other end 8b in the axial direction and is placed on the side (an upper side in FIG. 1) closer to the step motor 7 relative to the lip seal 9. As shown in FIG. 1, the deposit guard plug 10 is placed on the side (a lower side in FIG. 1) closer to the flow passage 2 relative to the lip seal 9. The step motor 7 corresponds to one example of a "driving unit" in the present disclosure. The lip seal 9 corresponds to one example of a "seal member" in the present disclosure. The deposit guard plug 10 corresponds to one example of a "deposit guard part" and a "deposit guard member" in the present disclosure. The housing 3 is provided with a mounting hole 3a to mount the valve shaft 6 and retain the lip seal 9 and the deposit guard plug 10 by press-fitting. The mounting hole 3a has an opening 3aa that opens in the flow passage 2. The thrust bearing 8, lip seal 9, and deposit guard plug 10 are retained in the mounting hole 3a around the valve shaft 6 as a center. The deposit guard plug 10 is retained near the opening 3aa of the mounting hole 3a by press-fitting. Between the deposit guard plug 10 and the valve shaft 6, a fine clearance is provided to allow air to pass through.

In the present embodiment, the housing 3 is made of a metal material (e.g., aluminum). Both ends of the flow passage 2 formed in the housing 3 serve as an inlet 2a for inflow of EGR gas and an outlet 2b for outflow of EGR gas. The valve seat 4 is provided in the flow passage 2 and includes a valve hole 4a communicated with the flow passage 2.

The valve shaft 6 is provided between the step motor 7 and the valve element 5 and is placed vertically through the housing 3 in FIG. 1. The valve element 5 is fixed to a lower end portion of the valve shaft 6, has a conical shape, the conical surface of which is brought into contact with or separated from the valve seat 4. An upper end portion of the valve shaft 6 is provided integrally with a spring rest 11.

The step motor 7 includes a stator 22 including a coil 21, a magnet rotor 23 provided inside the stator 22, and an output shaft 12 provided at the center of the magnet rotor 23. Those components 12, 21 to 23, and others are covered with a resin casing 24 by molding. The casing 24 is integrally formed with a connector 25 protruding sideways. The connector 25 is provided with terminals 26 extending from the coil 21.

The output shaft 12 has a male screw 12a on its outer periphery. The lower end of the output shaft 12 is connected to the spring rest 11 provided at the upper end portion of the valve shaft 6. The magnet rotor 23 includes a rotor body 27 and a cylindrical plastic magnet 28 provided integrally on the outer periphery of the rotor body 27. A first radial bearing 29 is provided between the outer periphery of an upper end portion of the rotor body 27 and the casing 24. A second radial bearing 30 is provided between the inner periphery of a lower end portion of the plastic magnet 28 and the thrust bearing 8. Those upper and lower bearings 29 and 30 support the magnet rotor 23 to be rotatable inside the stator 22. The rotor body 27 is formed, at its center, with a female screw 27a, which threadedly engages with the male screw 12a of the output shaft 12. A first compression spring 31 is provided between the magnet rotor 23 and the lower second radial bearing 30. A second compression spring 32 is provided between the spring rest 11 and the second radial bearing 30 to urge the valve shaft 6 toward the magnet rotor 23, that is, in a valve closing direction to cause the valve element 5 to seat on the valve seat 4.

As shown in FIG. 1, in a fully-closed state where the valve element 5 seats on the valve seat 4, when the magnet rotor 23 rotates in one direction, the output shaft 12 performs the stroke movement in a downward direction in FIG. 1, which is a thrust direction, while rotating in the one direction by the threaded engagement relationship between the male screw 12a of the output shaft 12 and the female screw 27a of the rotor body 27, against the urging force of the second compression spring 32. In association with this stroke movement of the output shaft 12, the valve element 5 performs a stroke movement together with the valve shaft 6 in the downward direction in FIG. 1, and the valve element 5 is separated from the valve seat 4 for valve opening.

In contrast, in a fully-open state (not shown) where the valve element 5 is located at a maximum distance away from the valve seat 4, when the magnet rotor 23 rotates in an opposite direction, the output shaft 12 performs the stroke movement in an upward direction in FIG. 1, which is a thrust direction, while rotating in the opposite direction by the threaded engagement relationship between the male screw 12a of the output shaft 12 and the female screw 27a of the rotor body 27 and the urging force of the second compression spring 32. In this stroke movement of the output shaft 12, the valve element 5 performs a stroke movement together with the valve shaft 6 in the upward direction in FIG. 1, and the valve element 5 comes close to the valve seat 4 for valve closing and to a fully-closed state shown in FIG. 1.

(Lip Seal and Deposit Guard Plug)

Figure 2:
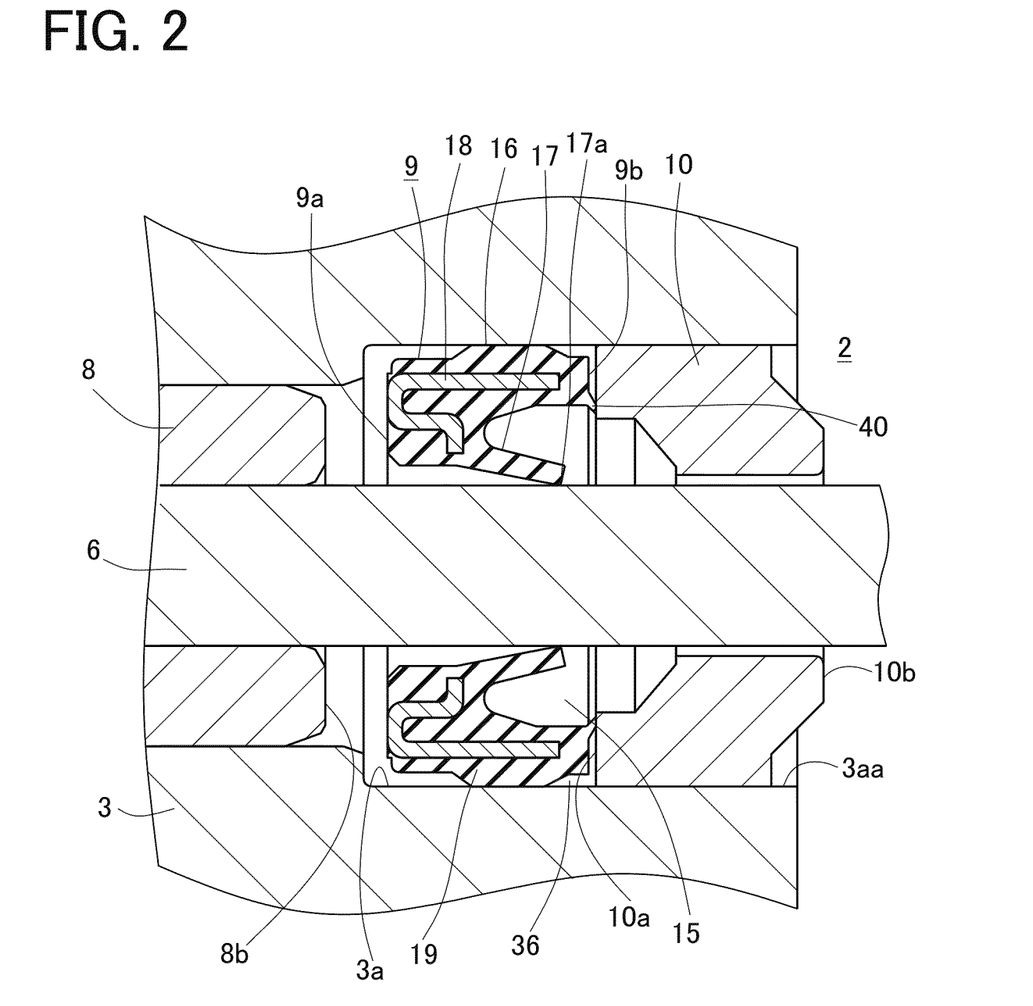
FIG. 2 is an enlarged cross-sectional view showing a section enclosed by a dashed-line rectangle in FIG. 1 in the first embodiment.
Figure 3:
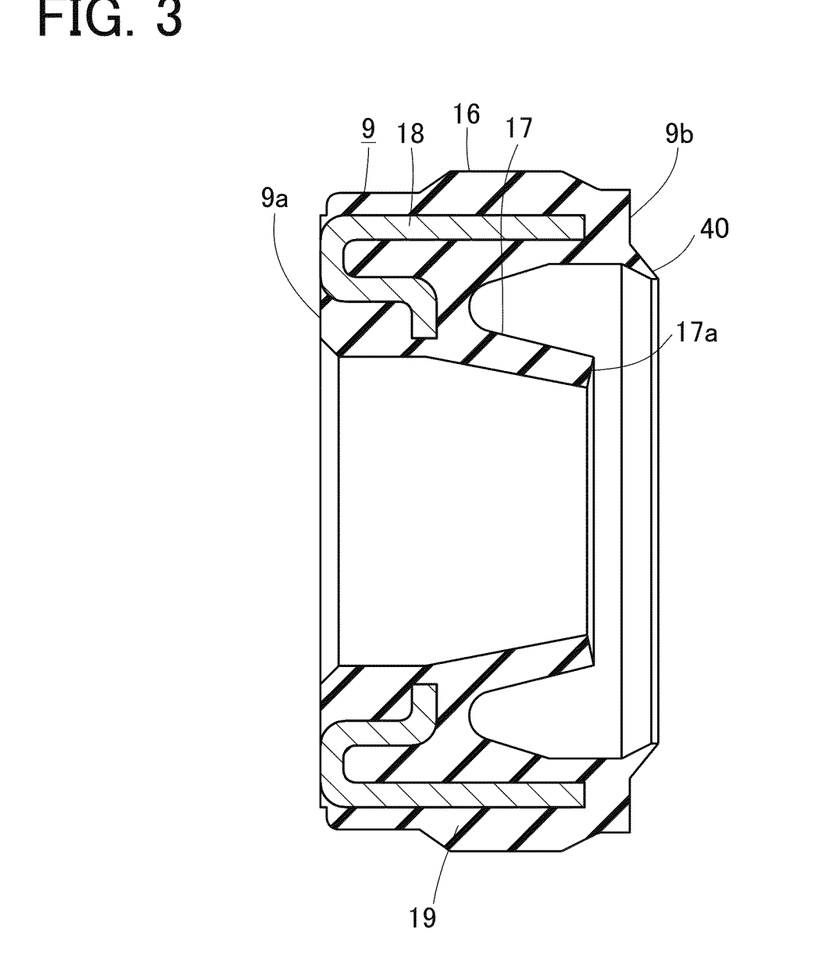
FIG. 3 is a cross-sectional view showing a lip seal before being mounted in a housing in the first embodiment.
Figure 4:
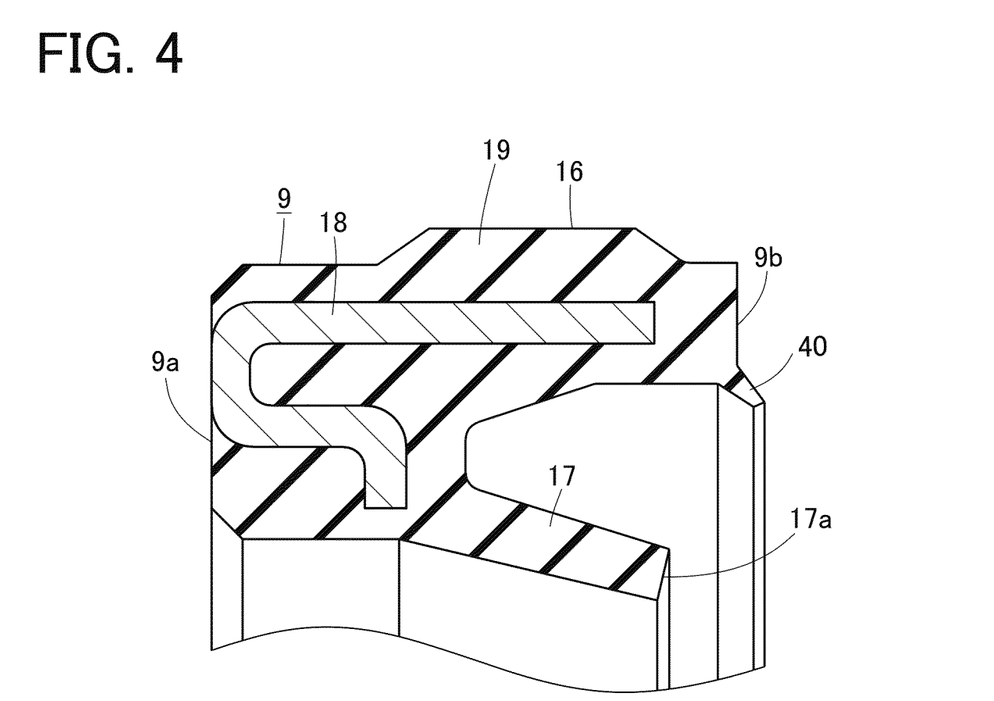
FIG. 4 is an enlarged cross-sectional view showing a part of the lip seal in FIG. 3 in the first embodiment.

FIG. 2 is an enlarged cross-sectional view showing a section enclosed by a dashed-line rectangle S1 in FIG. 1. FIG. 3 is a cross-sectional view showing the lip seal 9 before being mounting in the housing 3. FIG. 4 is an enlarged cross-sectional view showing a part of the lip seal 9 illustrated in FIG. 3. FIGS. 2 to 4 show the EGR valve 1 in an orientation assumed that the valve shaft 6 is placed horizontally sideways (the same is applied to FIGS. 5 to 10 which will be described later). As shown in FIGS. 1 and 2, the lip seal 9 is provided between the housing 3 and the valve shaft 6 to seal between the housing 3 and the valve shaft 6. This lip seal 9 is press-fitted in the mounting hole 3a of the housing 3. The valve shaft 6 extends through the center of the lip seal 9. A lip seal chamber 15 is formed, as the space communicated with the flow passage 2, between the housing 3, valve shaft 6, and lip seal 9.

As shown in FIGS. 2 to 4, in the present embodiment, the lip seal 9 is made of a rubber material formed in a substantially double cylindrical shape and includes a retaining part 16, with which the lip seal 9 is retained in the mounting hole 3a of the housing 3, and a lip part 17 located inside the retaining part 16, having a distal end 17a whose an inner periphery elastically contacting with the outer periphery of the valve shaft 6 to seal therebetween. The lip seal 9 has one end 9a and the other end 9b in the axial direction. The lip part 17 is in contact with the outer peripheral surface of the valve shaft 6 on the side close to the other end 9b. The lip seal 9 is arranged with the one end 9a facing the thrust bearing 8 (toward the step motor 7) and the other end 9b facing the deposit guard plug 10 (toward the flow passage 2). The lip part 17 has a lip shape with a distal end portion slanted and converged toward the valve shaft 6 so as to contact the outer peripheral surface of the valve shaft 6. The distal end 17a of the lip part 17 is also placed facing toward the deposit guard plug 10 (toward the flow passage 2). The lip seal 9 is formed by insert molding with a metal reinforcement ring 18. Herein, the distal end 17a of the lip part 17 indicates a leading end from which the lip part 17 begins to contact the outer periphery of the valve shaft 6. In this embodiment, the distal end 17a of the lip part 17 is positioned inside the lip seal 9 more than the other end 9b (which is also the leading end of the retaining part 16) of the lip seal 9, while the proximal end of the lip part 17 is continuous to the one end 9a (which is also the base end of the retaining part 16) of the lip seal 9. The lip part 17 corresponds to one example of a "seal part" in the present disclosure. As shown in FIGS. 1 and 2, the deposit guard plug 10 has one end 10a and the other end 10b in the axial direction, and is mounted by press-fitting in the mounting hole 3a between the housing 3 and the valve shaft 6, adjacent to the lip seal 9.

As shown in FIGS. 1 to 4, in the present embodiment, the reinforcement ring 18 has a nearly cylindrical shape. The retaining part 16 is formed of a rubber material in a nearly cylindrical shape so as to enwrap the reinforcement ring 18, and retained in the mounting hole 3a. The lip part 17 is formed of the rubber material integral with the retaining part 16. In the present embodiment, as the rubber material, fluoro-rubber can be used. In general, the standard hardness of the fluoro-rubber used for the retaining part 16 is "Hs70 to 90". In the retaining part 16, the outer periphery of the reinforcement ring 18 is covered with an outer peripheral coating part 19 whose outer peripheral surface contacts the inner peripheral surface of the mounting hole 3a.

As shown in FIG. 2, the other end 8b of the thrust bearing 8 is placed adjacent to the one end 9a of the lip seal 9. The other end 9b of the lip seal 9 and the distal end 17a of the lip part 17 are placed adjacent to the one end 10a of the deposit guard plug 10. Further, the other end 10b of the deposit guard plug 10 is placed facing the flow passage 2.

As shown in FIGS. 2 to 4, the other end 9b of the lip seal 9 is provided with the seal protrusion 40. This seal protrusion 40 protrudes toward the one end 10a of the deposit guard plug 10 and contacts the one end 10a while being deformed to seal between the lip seal 9 and the deposit guard plug 10. The one end 10a of the deposit guard plug 10 has an annular flat face. The seal protrusion 40 has a lip shape with a distal end portion slanted and converged toward the valve shaft 6 to continuously contact the entire circumference of the annular one end 10a of the deposit guard plug 10.

(Mounting of Lip Seal and Deposit Guard Plug)

Figure 5:
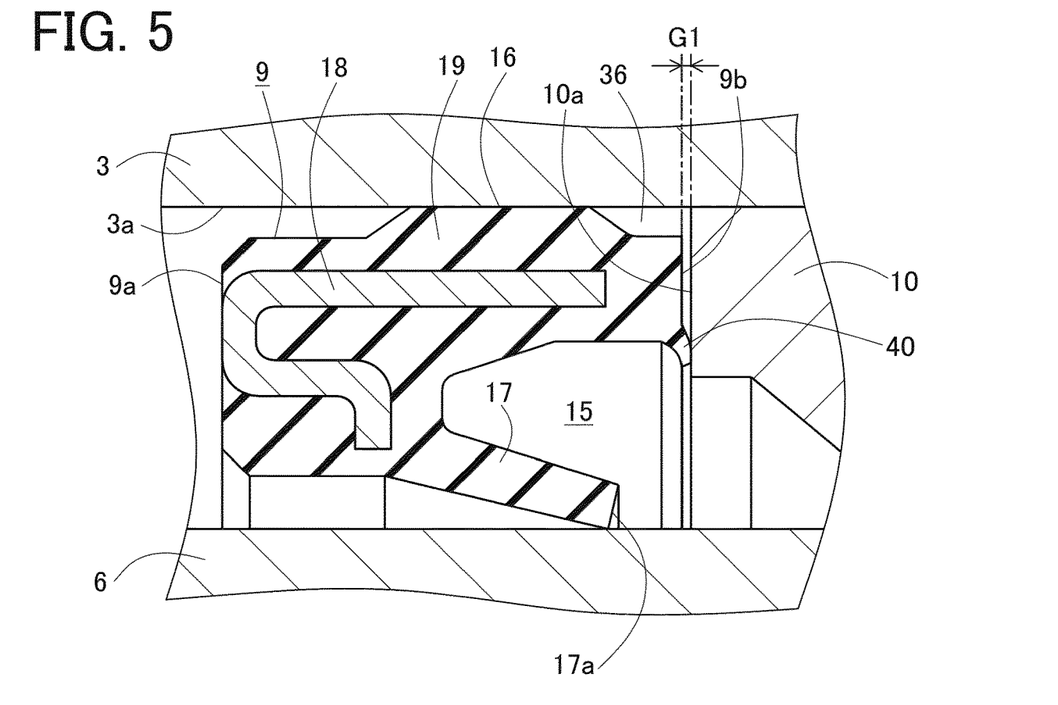
FIG. 5 is an enlarged cross-sectional view showing a part of the EGR valve in the first embodiment.
Figure 6:
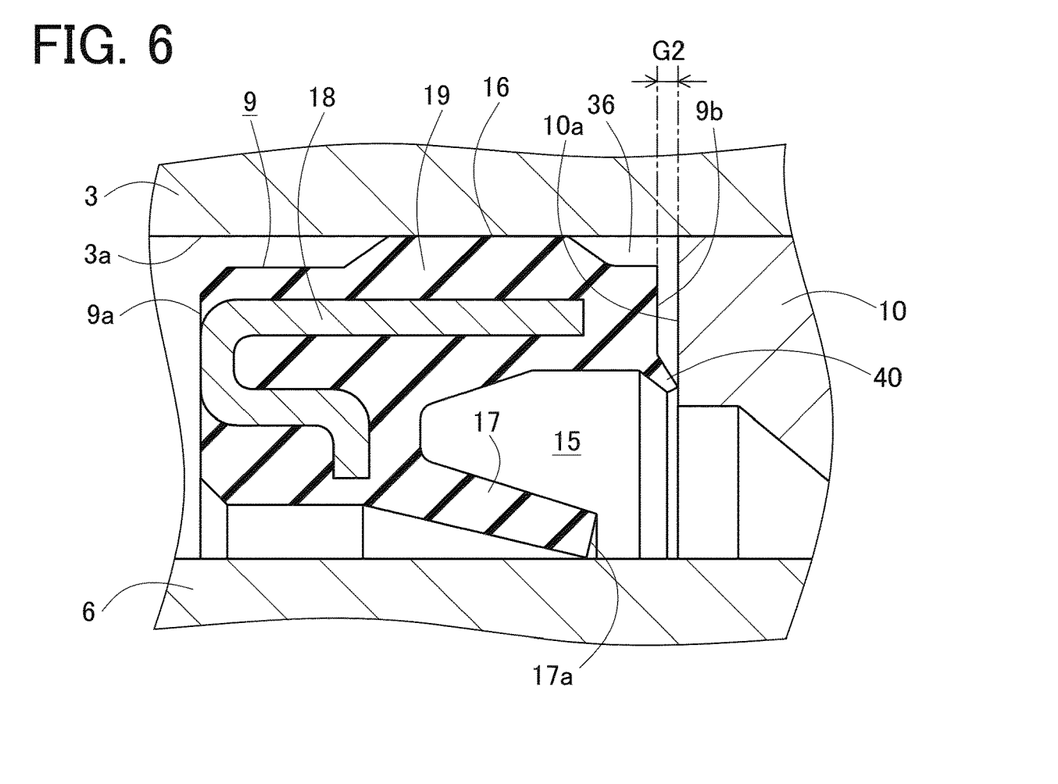
FIG. 6 is an enlarged cross-sectional view showing the part of the EGR valve in the first embodiment.

In the present embodiment, when the lip seal 9 and the deposit guard plug 10 are to be mounted in the mounting hole 3a, firstly, the lip seal 9 is mounted by press-fitting in the mounting hole 3a through the opening 3aa. Then, the deposit guard plug 10 is mounted by press-fitting in the mounting hole 3a through the opening 3aa. At that time, as shown in FIGS. 5 and 6, the deposit guard plug 10 is press-fitted into the mounting hole 3a so that the one end 10a of the deposit guard plug 10 comes into contact with the distal end of the seal protrusion 40 of the lip seal 9 and the one end 10a of the deposit guard plug 10 does not contact the end face (the other end 9b) of the retaining part 16 of the lip seal 9. In this case, the gap between the end face (the other end 9b) of the retaining part 16 of the lip seal 9 and the one end 10a of the deposit guard plug 10 can be adjusted between the minimum gap G1 shown in FIG. 5 and the maximum gap G2 shown in FIG. 6. The presence of the gap G1 or G2 prevents stress concentration from occurring on the end face (the other end 9b) of the retaining part 16 due to contact with the deposit guard plug 10. In the state shown in FIGS. 5 and 6, moreover, even though a component gap 36 is formed between the housing 3, lip seal 9, and deposit guard plug 10, this component gap 36 is blocked by the seal protrusion 40, shutting off a fluid such as EGR gas or the like from flowing into the component gap 36. FIGS. 5 and 6 are enlarged cross-sectional views showing a part of the EGR valve 1.

(Operations and Effects of the EGR Valve)

According to the foregoing EGR valve 1 configured as above in the present embodiment, when the EGR valve 1 is installed in the EGR passage for allowing EGR gas to flow from the exhaust passage to the intake passage of an engine, the lip seal 9 (the seal member) is placed with the one end 9a facing toward the step motor 7 (toward the thrust bearing 8) and the other end 9b facing toward the flow passage 2 (toward the deposit guard plug 10), and the distal end 17a of the lip part 17 facing toward the flow passage 2. Herein, during valve-opening, in which the valve element 5 of the EGR valve 1 is separated from the valve seat 4, EGR gas may enter the lip seal chamber 15 of the lip seal 9 from the flow passage 2 side through the clearance between the deposit guard plug 10 (the deposit guard member) and the valve shaft 6. However, the interference of the distal end 17a of the lip part 17 by elastic contact with the valve shaft 6 seals between the lip part 17 and the valve shaft 6. This can therefore ensure the sealing function of the lip seal 9.

According to the configuration in the present embodiment, since the lip seal 9 is press-fitted in the mounting hole 3a of the housing 3, the retaining part 16 is retained in the mounting hole 3a and further the space between the housing 3 and the valve shaft 6 is sealed. In this sealing state, in the lip seal 9, the outer peripheral surface of the outer peripheral coating part 19 on the outer periphery of the reinforcement ring 18 is in tight contact with the inner peripheral surface of the mounting hole 3a. The other end 9b of the lip seal 9 is provided with the seal protrusion 40, which protrudes toward the one end 10a of the deposit guard plug 10 and contacts with the one end 10a while being deformed to seal the space between the lip seal 9 and the deposit guard plug 10. Herein, although the component gap 36 is formed between the housing 3, lip seal 9, and deposit guard plug 10, the component gap 36 is blocked by the seal protrusion 40, shutting off a fluid such as EGR gas from flowing into the component gap 36. This configuration can suppress EGR gas and condensed water from entering the component gap 36 between the housing 3, lip seal 9 (seal member), and deposit guard plug 10 (deposit guard part (deposit guard member)), and prevent corrosion of the housing 3 due to the condensed water.

Comparative Example

Figure 7:
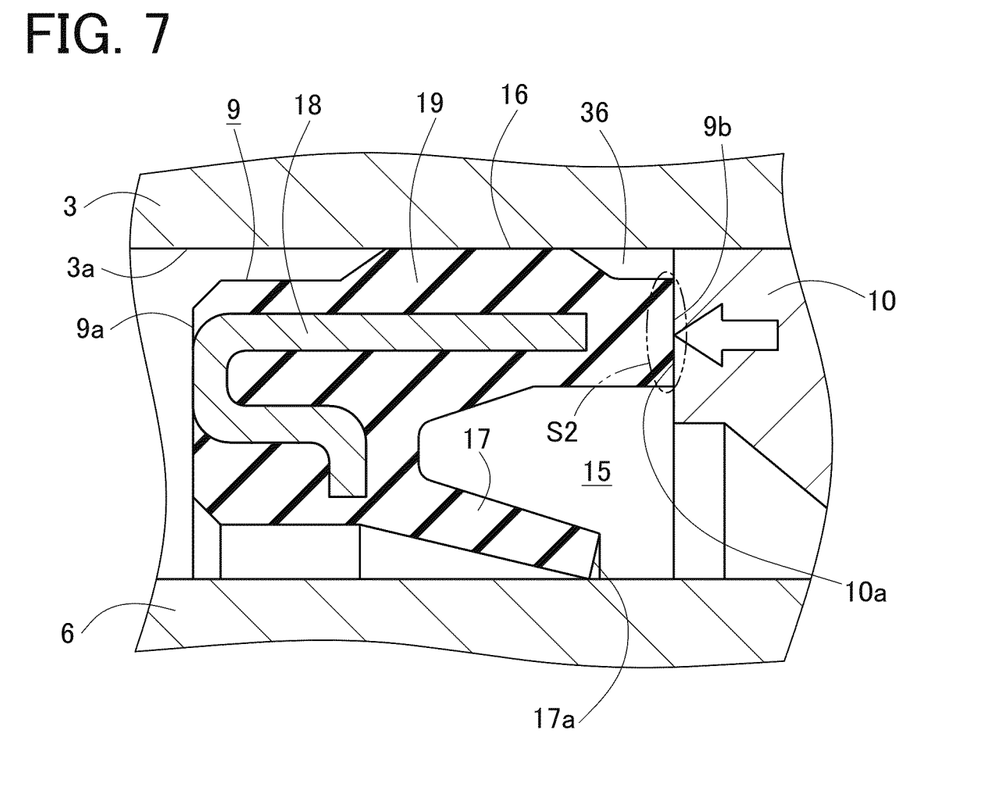
FIG. 7 is an enlarged cross-sectional view showing a part of an EGR valve in a comparative example of the first embodiment, similar to FIGS. 5 and 6.

Hereinafter, a comparative example will be described, in which the other end 9b of the lip seal 9 is not provided with the seal protrusion 40. FIG. 7 is an enlarged cross-sectional view, similar to FIGS. 5 and 6, showing a part of an EGR valve in the comparative example of the first embodiment. In this comparative example, as shown in FIG. 7, after the lip seal 9 is mounted by press-fitting into the mounting hole 3a, the deposit guard plug 10 is press-fitted into the mounting hole 3a through the opening 3aa so as to press the one end 10a of the deposit guard plug 10 against the other end 9b of the lip seal 9. When the lip seal 9 is press-fitted to the final position in the mounting hole 3a, no gap is formed between the lip seal 9 and the deposit guard plug 10. In this case, however, depending on a component tolerance, the slip resistance (the press-fit resistance) between the inner peripheral wall of the mounting hole 3a and the outer peripheral wall of the retaining part 16 of the lip seal 9 may increase.

In this case, the leading end portion of the retaining part 16 (the portion enclosed by a double-dashed-line ellipse S2) may be inserted in an abnormally deformed state into the mounting hole 3a. This may cause stress concentration on the deformed portion of the retaining part 16, resulting in defects, such as cracks. Furthermore, since the lip seal 9 under stress is mounted in the mounting hole 3a, the distal end 17a of the lip part 17 may also be deformed under the influence of the stress, which may decrease the sealing performance and the reliability of the lip part 17.

In contrast, according to the configuration in the present embodiment, the seal protrusion 40 is provided at the leading end (the other end 9b) of the retaining part 16 of the lip seal 9, and the lip seal 9 contacts the deposit guard plug 10 via the seal protrusion 40. Thus, the other end 9b of the lip seal 9 is not abnormally deformed and hence no stress concentrates on that portion, making it possible to obviate the occurrence of defects, such as cracks. Therefore, the distal end 17a of the lip part 17 is not influenced by unnecessary stress, so that the lip part 17 can ensure the sealing performance and the reliability.

According to the configuration in the present embodiment, the lip seal 9 (the seal member) and the deposit guard plug 10 (the deposit guard member) can be inserted respectively into the mounting hole 3a through the opening 3aa from the flow passage 2 side. Specifically, after the lip seal 9 is mounted by press-fitting into the mounting hole 3a through the opening 3aa, the deposit guard plug 10 can be mounted by press-fitting into the mounting hole 3a through the same opening 3aa. At this time, after the lip seal 9 is mounted in the mounting hole 3a, the press-fit depth of the deposit guard plug 10 in the mounting hole 3a can be appropriately adjusted. This can facilitate adjustment of the contact allowance between the seal protrusion 40 and the deposit guard plug 10.

According to the configuration in the present embodiment, the seal protrusion 40 has a lip shape with the distal end portion slanted and converged toward the valve shaft 6, so that the initial contact pressure between the seal protrusion 40 and the deposit guard plug 10 (the deposit guard member) can be reduced. Thus, the seal protrusion 40 can tightly contact the one end 10a of the deposit guard plug 10, so that the sealing property by the seal protrusion 40 can be enhanced.

Second Embodiment

Next, a second embodiment embodying an EGR valve will be described in detail, referring to the drawings. In the following description, similar or identical components to those in the first embodiment are assigned the same reference signs and their details are omitted, and differences from the first embodiment will be mainly described.
(Configuration of Mounting Hole)

Figure 8:
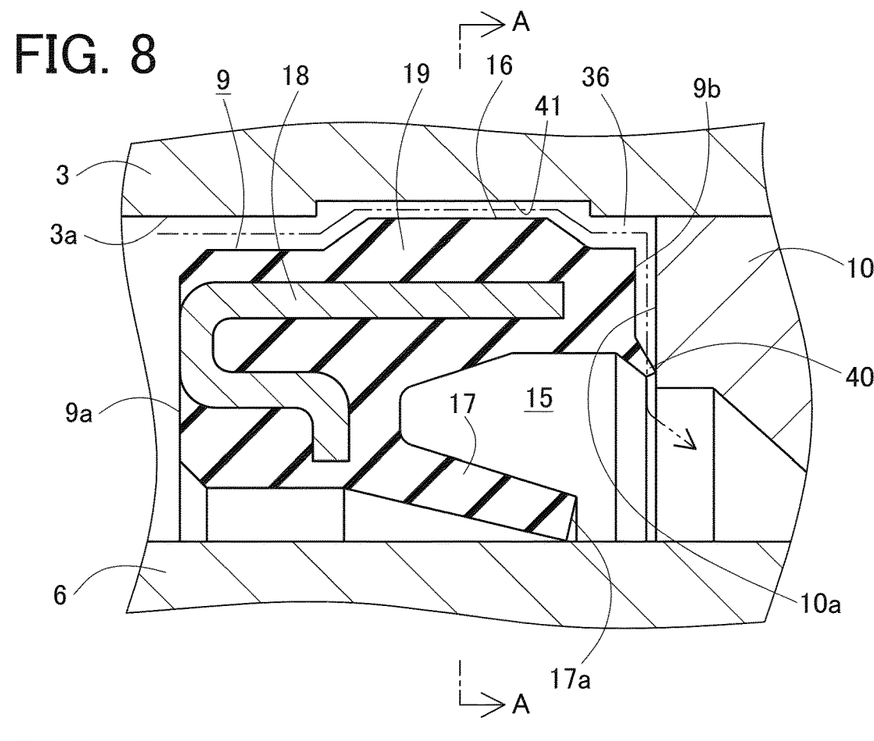
FIG. 8 is an enlarged cross-sectional view showing a part of an EGR valve in a second embodiment, similar to FIGS. 5 and 6.
Figure 9:
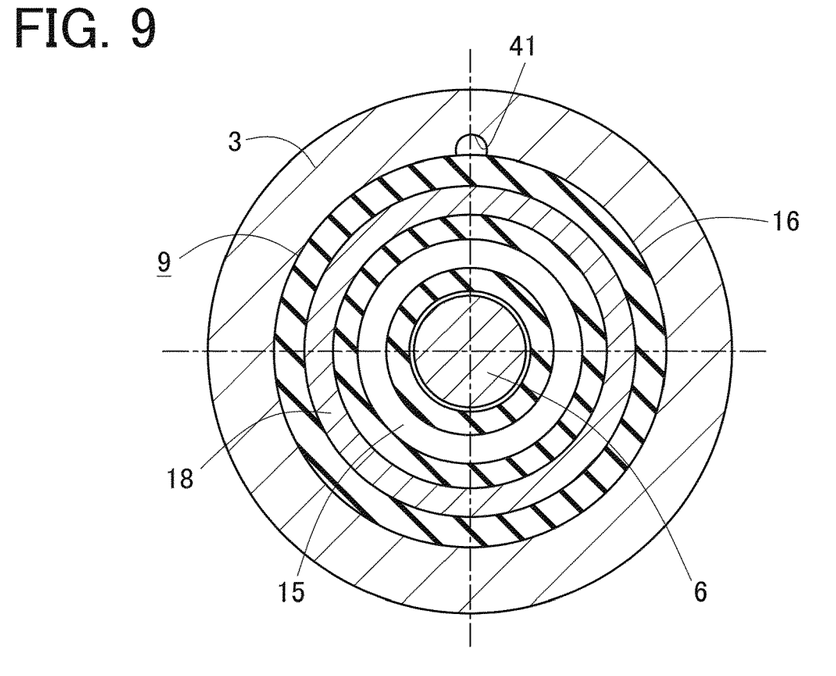
FIG. 9 is a cross-sectional view showing a part of the EGR valve, taken along an A-A line in FIG. 8, in the second embodiment.

The EGR valve 1 in the present embodiment differs from the first embodiment in the configuration of the mounting hole 3a. FIG. 8 is an enlarged cross-sectional view, similar to FIGS. 5 and 6, showing a part of the EGR valve 1 in this embodiment. FIG. 9 is a cross-sectional view taken along a line A-A in FIG. 8 showing a part of the EGR valve 1 in this embodiment. In this embodiment, as shown FIGS. 8 and 9, between a portion of the mounting hole 3a, in which the retaining part 16 of the lip seal 9 (the seal member) is press-fitted, and the retaining part 16 of the lip seal 9, a single communicating path 41 is provided to allow communication between the side of the one end 9a and the side of the other end 9b of the lip seal 9. In present embodiment, this communicating path 41 is provided by the groove formed extending in the axial direction in the inner peripheral surface of the mounting hole 3a. Other configurations of the EGR valve 1 are identical to those in the first embodiment.
(Operations and Effects of the EGR Valve)

The foregoing EGR valve 1 configured as above in the present embodiment, different from the first embodiment, can achieve the following operations and effects. Specifically, the single communicating path 41 is provided between the portion of the mounting hole 3a, in which the retaining part 16 of the lip seal 9 is press-fitted, and the retaining part 16 to allow communication between the side of one end 9a and the side of the other end 9b of the lip seal 9. Herein, as shown in FIG. FIG. 8, the component gap 36 is formed between the housing 3, the lip seal 9, and the deposit guard plug 10. This component gap 36 is communicated with the side of the thrust bearing 8, that is, the atmospheric side, through the communicating path 41. Meanwhile, the lip seal chamber 15 is formed between the housing 3, the valve shaft 6, and the lip seal 9, communicating with the flow passage 2. Further, the component gap 36 is closed by the seal protrusion 40, thus shutting off flow of a fluid, such as EGR gas, to the component gap 36.

When an intake negative pressure of the engine acts on the flow passage 2, this intake negative pressure from the flow passage 2 acts on the seal protrusion 40 via the lip seal chamber 15. At that time, this seal protrusion 40 is pulled by the intake negative pressure and deformed, separating from the one end 10a of the deposit guard plug 10, so that fresh air is allowed to flow from the atmospheric side to the lip seal chamber 15 and the flow passage 2 through the communicating path 41 and the component gap 36 as indicated by a double-dashed-line arrow in FIG. 8, thereby sweeping the communicating path 41 and the component gap 36. Therefore, even if EGR gas and condensed water enter the component gap 36 and the communicating path 41, formed between the housing 3, the lip seal 9, and the deposit guard plug 10, it is possible to discharge the condensed water and others by sweeping into the flow passage 2 through the lip seal chamber 15, using the intake negative pressure from the flow passage 2 acting on the seal protrusion 40.

Third Embodiment

A third embodiment embodying an EGR valve will be described in detail below, referring to drawings.
(Configuration of Mounting Hole and Others)

Figure 10:
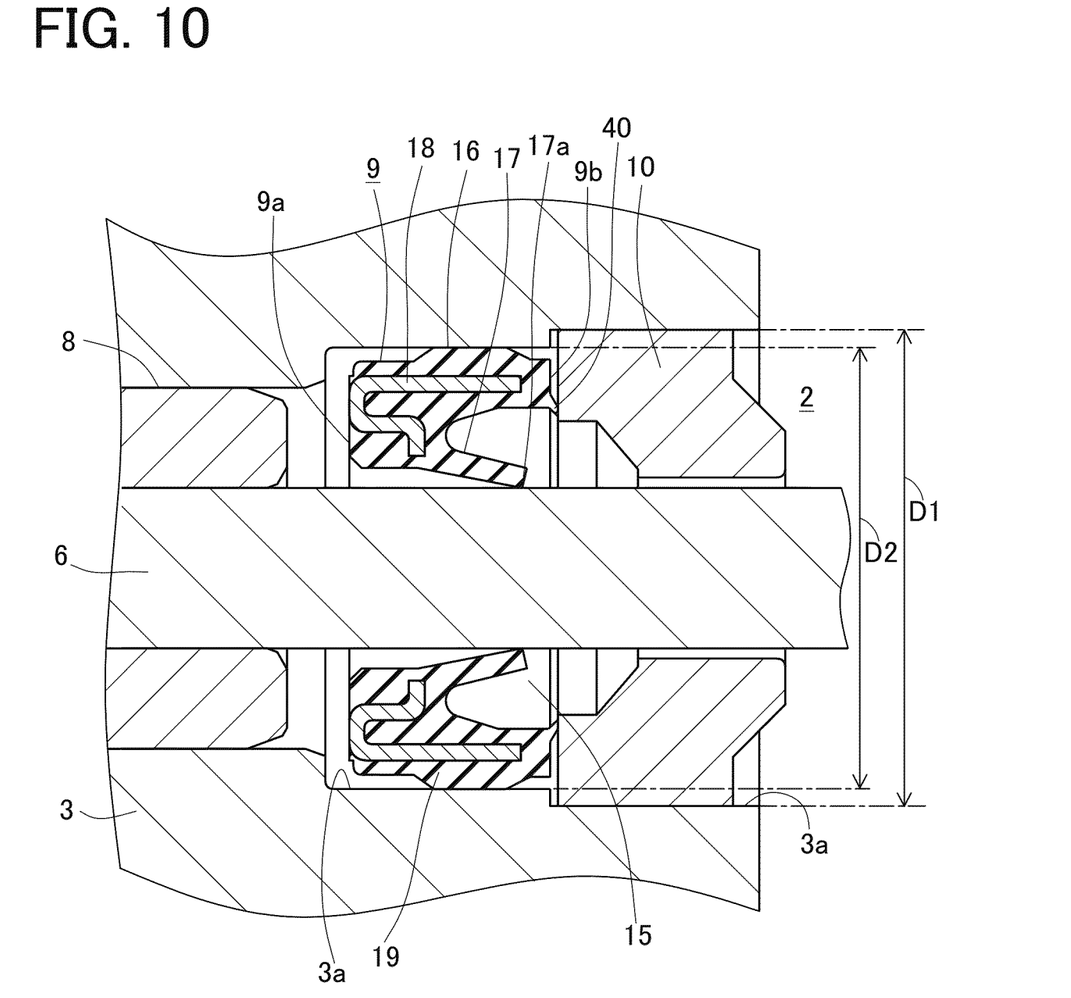
FIG. 10 is a cross-sectional view showing a part of an EGR valve in a third embodiment, similar to FIG. 2.

The EGR valve 1 in the present embodiment differs from the first embodiment in the configuration of the mounting hole 3a. FIG. 10 is an enlarged cross-sectional view, similar to FIG. 2, showing a part of the EGR valve 1 in this embodiment. In this embodiment, as shown in FIG. 10, the inner diameter D1 of a portion of the mounting hole 3a, in which the deposit guard plug 10 is press-fitted, is set larger than the inner diameter D2 of another portion of the mounting hole 3a, in which the lip seal 9 is press-fitted. In accordance with the settings of the inner diameters D1 and D2, the outer diameter of the deposit guard plug 10 is set larger than the outer diameter of the lip seal 9.
(Operations and Effects of the EGR Valve)

The foregoing EGR valve 1 configured as above in the present embodiment can achieve the following operations and effects in addition to the operations and effects in the first embodiment. Specifically, in this embodiment, the inner diameter D1 of a portion of the mounting hole 3a, in which the deposit guard plug 10 (the deposit guard member) is press-fitted, is set larger than the inner diameter D2 of another portion of the mounting hole 3a, in which the lip seal 9 (the seal member) is press-fitted. Thus, even if condensed water enters the component gap 36 formed between the housing 3, the lip seal 9, and the deposit guard plug 10, this condensed water is likely to flow to the portion of the mounting hole 3a with the larger inner diameter D1, in which the deposit guard plug 10 is press-fitted, so that the condensed water is less likely to intervene between the housing 3 and the lip seal 9. This configuration can further prevent corrosion of the housing 3 due to the condensed water.

Other Embodiments

The present disclosure is not limited to each of the aforementioned embodiments, and may be implemented with appropriate changes to some of the configurations without departing from the essential characteristics of the disclosure.

Figure 11:
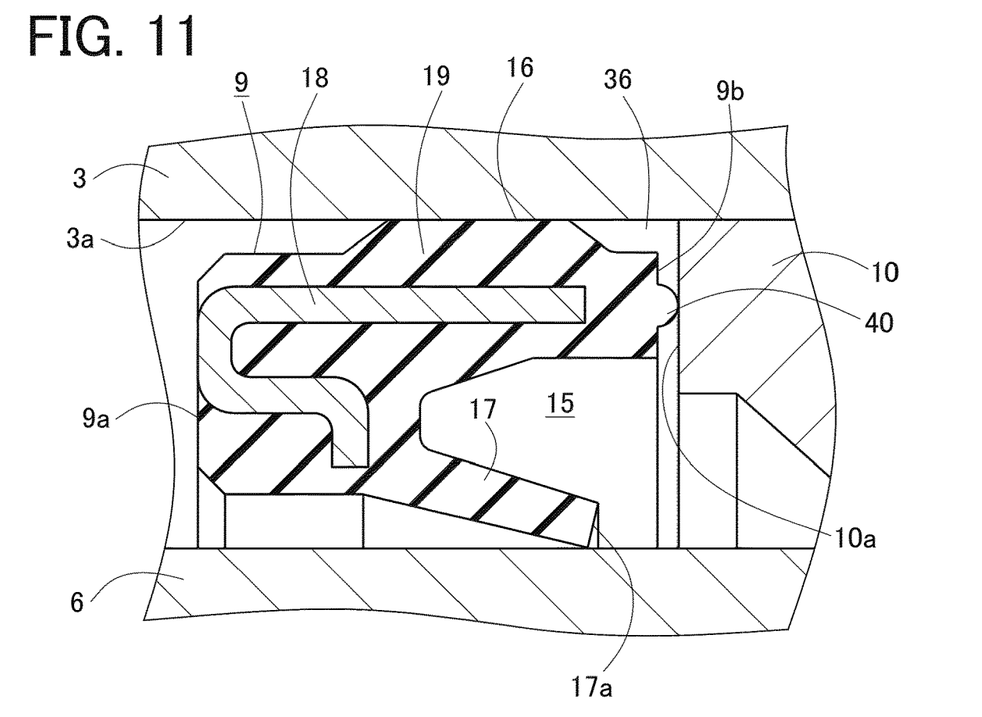
FIG. 11 is a cross-sectional view showing a part of an EGR valve in another embodiment, similar to FIG. 6.

(1) In each of the foregoing embodiments, as shown in FIGS. 5 and 6, the seal protrusion 40 has a lip shape with a distal end portion slanted and converged toward the valve shaft 6 to continuously contact the annular one end 10a of the deposit guard plug 10 (the deposit guard part or the deposit guard member) over its entire circumference. In contrast, as shown in FIG. 11, the seal protrusion 40 may be formed in a semi-elliptical shape in cross-section so as to continuously contact the annular one end 10a of the deposit guard plug 10 over its entire circumference. FIG. 11 is an enlarged cross-sectional view, similar to FIG. 6, showing a part of the EGR valve 1.

Figure 12:
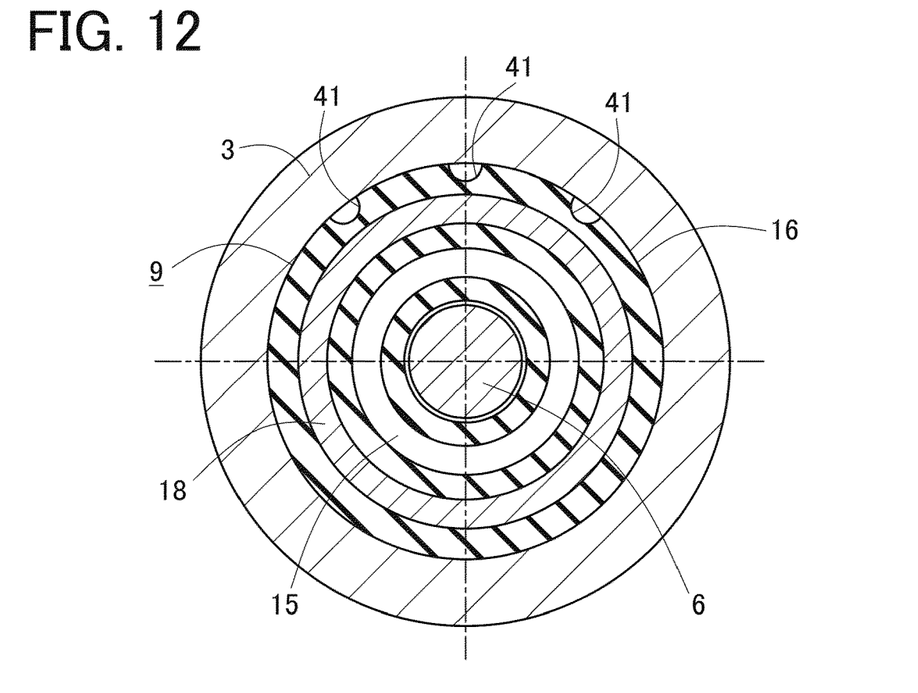
FIG. 12 is a cross-sectional view showing a part of an EGR valve in another embodiment, similar to FIG. 9.

(2) In the forgoing second embodiment, as shown in FIGS. 8 and 9, the single communicating path 41 is provided by a single groove formed in the inner peripheral surface of the mounting hole 3a, extending in the axial direction. In contrast, as shown in FIG. 12, multiple communicating paths 41 may be provided by multiple grooves formed in the outer peripheral surface of the retaining part 16 of the lip seal 9, extending in the axial direction. FIG. 12 is an enlarged cross-sectional view, similar to FIG. 9, showing a part of the EGR valve 1.

(3) In each of the foregoing embodiments, the EGR valve of the present disclosure is embodied as a poppet valve and as an electrically-operated valve. As an alternative, the EGR valve of the present disclosure may be configured and embodied as a double-eccentric valve, not the poppet valve, and as the electrically-operated valve.

(4) In each of the foregoing embodiments, the deposit guard part is constituted of the deposit guard plug 10 formed as the deposit guard member separately from the housing 3 and mounted in the mounting hole 3a. As an alternative, the deposit guard part may be formed integral with the housing in correspondence to the mounting hole.

INDUSTRIAL APPLICABILITY

The present disclosure can be utilized for an EGR device provided in a gasoline engine and a diesel engine.

REFERENCE SIGNS LIST

1 EGR valve
2 Flow passage
3 Housing
3a Mounting hole
4 Valve seat
5 Valve element
6 Valve shaft
7 Step motor (Driving unit)
8 Thrust bearing
8a One end
8b Other end
9 Lip seal (Seal member)
9a One end
9b Other end
10 Deposit guard plug (Deposit guard part, Deposit guard member)
10a One end
10b Other end
17 Lip part (Seal member)
40 Seal protrusion
41 Communicating path
D1 Inner Diameter
D2 Inner diameter

The invention claimed is:

1. An EGR valve comprising:
a housing having a flow passage for EGR gas;
a valve seat provided in the flow passage;
a valve element provided to be seatable on the valve seat;
a valve shaft provided integral with the valve element to move the valve element with respect to the valve seat;
a driving unit for driving the valve shaft together with the valve element;
a bearing provided between the housing and the valve shaft to drivably support the valve shaft, the bearing having one end and an other end in an axial direction;
a seal member provided between the housing and the valve shaft, adjacent to the bearing, to seal between the housing and the valve shaft, the seal member having one end and an other end in the axial direction and including a seal part in contact with the valve shaft on a side of the other end;
a mounting hole provided in the housing to retain the seal member; and
a deposit guard part provided between the housing and the valve shaft, adjacent to the seal member retained in the mounting hole, to prevent intrusion of deposits from the flow passage into the mounting hole, the deposit guard part having one end and an other end in the axial direction,
the one end of the seal member being placed adjacent to the other end of the bearing, the one end of the deposit guard part being placed adjacent to the other end of the seal member and the seal part, and the other end of the deposit guard part facing the flow passage,
wherein the other end of the seal member is provided with a seal protrusion protruding toward the one end of the deposit guard part and contacting the one end while being deformed to seal between the seal member and the deposit guard part.

2. The EGR valve according to claim 1, wherein the seal protrusion has a lip shape with a distal end portion slanted and converged toward the valve shaft.

3. The EGR valve according to claim 1, wherein the deposit guard part is constituted of a deposit guard member retained in the mounting hole.

4. The EGR valve according to claim 3, wherein a part of the mounting hole, in which the deposit guard member is retained, has an inner diameter set larger than an inner diameter of another part of the mounting hole, in which the seal member is retained.

5. The EGR valve according to claim 1, wherein at least one communicating path is provided between a part of the mounting hole, in which the seal member is retained, and the seal member, to allow communication between a side of the one end and the side of the other end of the seal member.

6. The EGR valve according to claim 2, wherein the deposit guard part is constituted of a deposit guard member retained in the mounting hole.

7. The EGR valve according to claim 6, wherein a part of the mounting hole, in which the deposit guard member is retained, has an inner diameter set larger than an inner diameter of another part of the mounting hole, in which the seal member is retained.

8. The EGR valve according to claim 2, wherein at least one communicating path is provided between a part of the mounting hole, in which the seal member is retained, and the seal member, to allow communication between a side of the one end and the side of the other end of the seal member.

9. The EGR valve according to claim 3, wherein at least one communicating path is provided between a part of the mounting hole, in which the seal member is retained, and the seal member, to allow communication between a side of the one end and the side of the other end of the seal member.

10. The EGR valve according to claim 4, wherein at least one communicating path is provided between the part of the mounting hole, in which the seal member is retained, and the seal member, to allow communication between a side of the one end and the side of the other end of the seal member.

11. The EGR valve according to claim 6, wherein at least one communicating path is provided between a part of the mounting hole, in which the seal member is retained, and the seal member, to allow communication between a side of the one end and the side of the other end of the seal member.

12. The EGR valve according to claim 7, wherein at least one communicating path is provided between the part of the mounting hole, in which the seal member is retained, and the seal member, to allow communication between a side of the one end and the side of the other end of the seal member.

* * * * *